(12) United States Patent
Sano et al.

(10) Patent No.: US 11,415,219 B2
(45) Date of Patent: Aug. 16, 2022

(54) TRANSMISSION MECHANISM INCLUDING SHIFT DRUM AND ACTUATOR UNIT WHICH ARE COAXIALLY DISPOSED

(71) Applicant: KAWASAKI MOTORS, LTD., Hyogo (JP)

(72) Inventors: Katsuya Sano, Kakogawa (JP); Masaki Nishiyabu, Akashi (JP); Satoaki Ichi, Akashi (JP); Kyohei Izumi, Kobe (JP); Yuji Hida, Akashi (JP)

(73) Assignee: KAWASAKI MOTORS, LTD., Kobe (JP)

( * ) Notice: Subject to any disclaimer, the term of this patent is extended or adjusted under 35 U.S.C. 154(b) by 0 days.

(21) Appl. No.: 16/895,128

(22) Filed: Jun. 8, 2020

(65) Prior Publication Data

US 2021/0010591 A1 Jan. 14, 2021

(30) Foreign Application Priority Data

Jul. 12, 2019 (JP) .............................. JP2019-130278

(51) Int. Cl.
*F16H 63/18* (2006.01)
*B62M 25/02* (2006.01)
*F16H 57/02* (2012.01)
*F16H 63/30* (2006.01)

(52) U.S. Cl.
CPC .............. *F16H 63/18* (2013.01); *B62M 25/02* (2013.01); *F16H 57/02* (2013.01); *F16H 2057/02065* (2013.01); *F16H 2063/3056* (2013.01)

(58) Field of Classification Search
CPC ..................... F16H 63/18; F16H 57/02; F16H 2057/02065; F16H 2063/3056; F16H 63/38; F16H 2059/6807; B62M 25/02
See application file for complete search history.

(56) References Cited

U.S. PATENT DOCUMENTS

| | | | | |
|---|---|---|---|---|
| 5,224,393 A * | 7/1993 | Ashikawa | ............. | B60K 20/06 4/619 |
| 6,085,607 A * | 7/2000 | Narita | ................... | B60W 10/02 192/3.56 |
| 6,370,976 B1 * | 4/2002 | Doppling | ................ | F16H 63/18 74/337.5 |
| 7,963,183 B2 * | 6/2011 | Pick | ........................ | F16H 63/48 74/337 |
| 8,433,489 B2 | 4/2013 | Arai | | |
| 9,062,765 B2 * | 6/2015 | Shiozaki | ................ | F16H 63/18 |

(Continued)

FOREIGN PATENT DOCUMENTS

DE 102017102212 A1 8/2018
JP 2012197853 A 10/2012

*Primary Examiner* — Victor L MacArthur
(74) *Attorney, Agent, or Firm* — Alleman Hall Creasman & Tuttle LLP (57) ABSTRACT

A straddle vehicle includes: a shift drum that makes a shift change of a transmission including a plurality of gear trains; a transmission case enclosing the shift drum, the transmission case including a side wall portion provided with an insertion hole into which an end portion of the shift drum is inserted; and an actuator unit secured to an outer surface of the side wall portion, the actuator unit including a drive shaft that outputs drive power to rotate the shift drum, the drive shaft having the same rotational axis as the shift drum and being connected to the shift drum on the rotational axis.

9 Claims, 4 Drawing Sheets

(56) References Cited

U.S. PATENT DOCUMENTS

| | | | |
|---|---|---|---|
| 9,909,665 B2* | 3/2018 | Fujimoto | F16H 61/32 |
| 2005/0081664 A1 | 4/2005 | Kawakubo et al. | |
| 2012/0240702 A1* | 9/2012 | Tokito | F16H 61/18 |
| | | | 74/337.5 |
| 2014/0095033 A1* | 4/2014 | Kojima | F16H 61/0204 |
| | | | 701/52 |
| 2014/0095034 A1* | 4/2014 | Nedachi | F16H 59/0204 |
| | | | 701/52 |
| 2017/0284485 A1* | 10/2017 | Tsunashima | F16D 48/064 |

* cited by examiner

TRANSMISSION MECHANISM INCLUDING SHIFT DRUM AND ACTUATOR UNIT WHICH ARE COAXIALLY DISPOSED

CROSS-REFERENCE TO RELATED APPLICATION

This application claims priority to and the benefit of Japanese Patent Application No. 2019-130278, filed on Jul. 12, 2019, the entire disclosure of which is incorporated herein by reference.

BACKGROUND OF THE INVENTION

Field of the Invention

The present disclosure relates to a straddle vehicle such as a motorcycle which includes a transmission and particularly to a transmission mechanism including a shift drum and an actuator unit which are coaxially disposed.

Description of the Related Art

In a straddle vehicle such as a motorcycle, a gear position sensor is engaged with an axial end face of a shift drum to detect the rotation angle of the shift drum. Since the gear position sensor is located on the axis of the shift drum, a shift lever to be operated by a foot of the rider is disposed away from the axis of the shift drum and connected to the shift drum via a linkage mechanism (Japanese Laid-Open Patent Application Publication No. 2012-197853).

It may be envisaged that the shift drum is configured to be driven by an actuator instead of being operated by a foot of the rider. In this case, however, a linkage mechanism between the actuator and the shift drum needs to be disposed such that the linkage mechanism avoids the actuator so as not to interfere with the actuator. The linkage mechanism therefore tends to be complicated. Further, if any reinforcement is provided to improve the durability of the linkage mechanism, the weight of the vehicle is increased.

SUMMARY OF THE INVENTION

A straddle vehicle according to one aspect of the present disclosure includes: a shift drum that makes a shift change of a transmission including a plurality of gear trains; a transmission case enclosing the shift drum, the transmission case including a side wall portion provided with an insertion hole into which an end portion of the shift drum is inserted; and an actuator unit secured to an outer surface of the side wall portion, the actuator unit including a drive shaft that outputs drive power to rotate the shift drum, the drive shaft having the same rotational axis as the shift drum and being connected to the shift drum on the rotational axis.

In the above configuration where the shift drum is rotated by the drive power of the actuator unit, the rotational drive power of the drive shaft is transmitted to the shift drum on the rotational axis of the shift drum. That is, the power transmission route from the drive shaft to the shift drum is straight. Hence, the linkage mechanism between the shaft and drum can be simplified. Further, no reinforcement is needed for power transmission, and a weight increase can be prevented.

DETAILED DESCRIPTION OF THE EMBODIMENTS

Hereinafter, an embodiment will be described with reference to the drawings.

Figure 1:
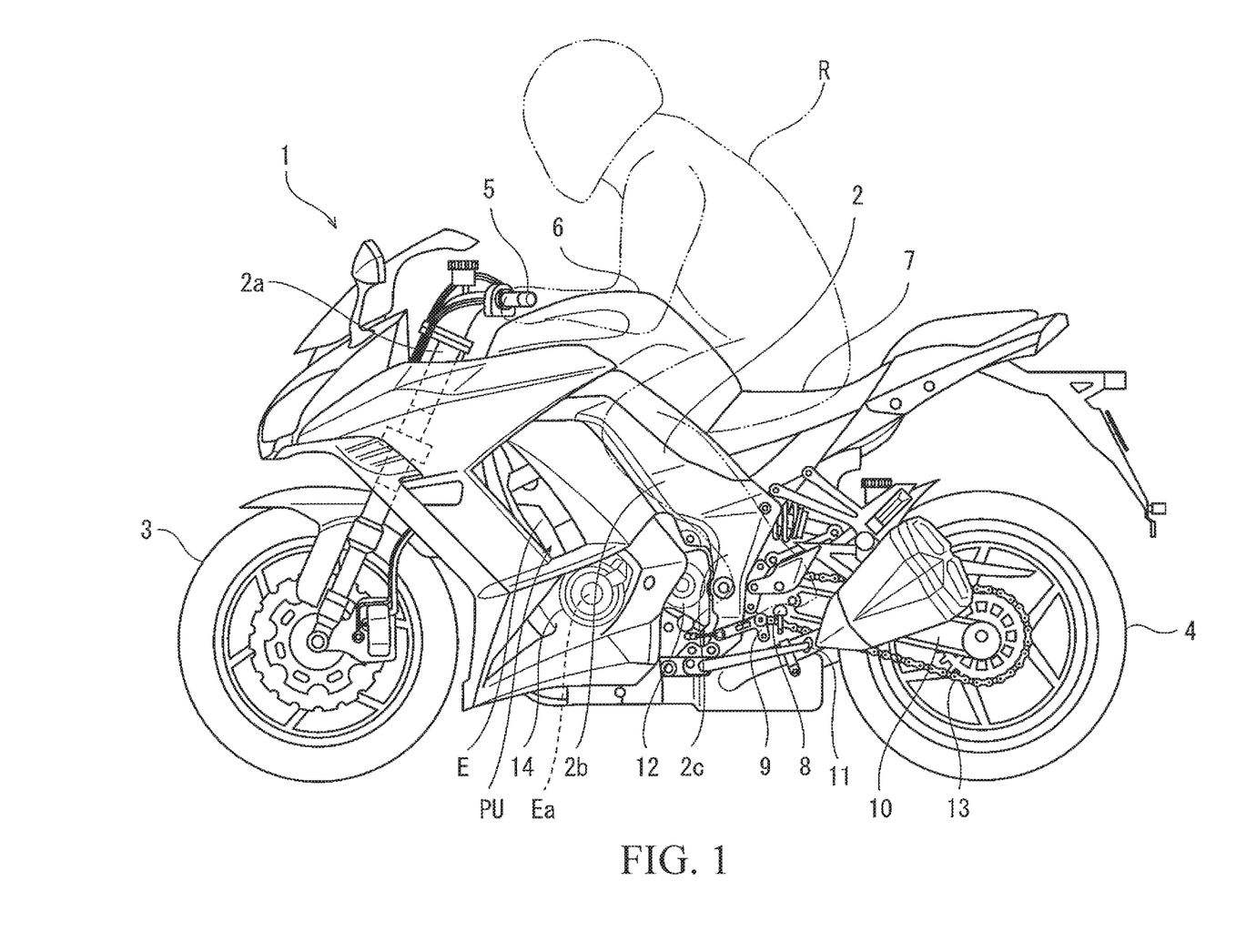
FIG. 1 is a left side view of a motorcycle according to an embodiment.

FIG. 1 is a left side view of a motorcycle 1 according to the embodiment. As shown in FIG. 1, the motorcycle 1, which is an example of the straddle vehicle of the present disclosure, includes a vehicle body frame 2 and front and rear wheels 3 and 4 supported by the vehicle body frame 2. The front wheel 3 is a driven wheel, and the rear wheel 4 is a drive wheel. The vehicle body frame 2 includes a head pipe 2a, a main frame 2b extending rearwardly from the head pipe 2a, and a pivot frame 2c connected to a rear portion of the main frame 2b. The head pipe 2a pivotally supports a steering shaft (not illustrated) connected to a bar-shaped handle 5 to be held by the rider R. The front wheel 3 is steered to the left or right in conjunction with pivotal movement of the steering shaft.

A fuel tank 6 is disposed rearwardly of the handle 5 and above the main frame 2b. A seat 7 on which the rider R is seated in a straddling position is disposed rearwardly of the fuel tank 6. Step members 8 on which the rider R places his/her feet are disposed below and on both sides of the seat 7. A shift lever 9 is disposed in the vicinity of one of the step members 8, and the shift lever 9 is operated by the foot placed on the step member 8. A front end of a swing arm 10 is pivotally supported by the pivot frame 2c, and the rear wheel 4 is pivotally supported by a rear end of the swing arm 10. A side stand 11 used to park the motorcycle 1 is mounted on one side of the pivot frame 2c in the vehicle width direction (left side in the present embodiment). Thus, when the side stand 11 is in use, the motorcycle 1 is inclined to one side in the vehicle width direction (left side in the present embodiment).

Between the front and rear wheels 3 and 4 is disposed a power unit PU supported by the main frame 2b and the pivot frame 2c. The power unit PU outputs drive power transmitted to the drive wheel (rear wheel 4). The power unit PU includes an engine E configured as an internal combustion engine and a transmission 12 configured to receive power transmitted from a crankshaft Ea of the engine E. The drive power output from the transmission 12 is transmitted to the rear wheel 4 through a chain 13 (power transmission loop). The crankshaft Ea of the engine E is enclosed in a crankcase 14 supported by the vehicle body frame 2. The crankcase 14 further encloses the transmission 12; that is, the crankcase 14 serves also as a transmission case.

Figure 2:
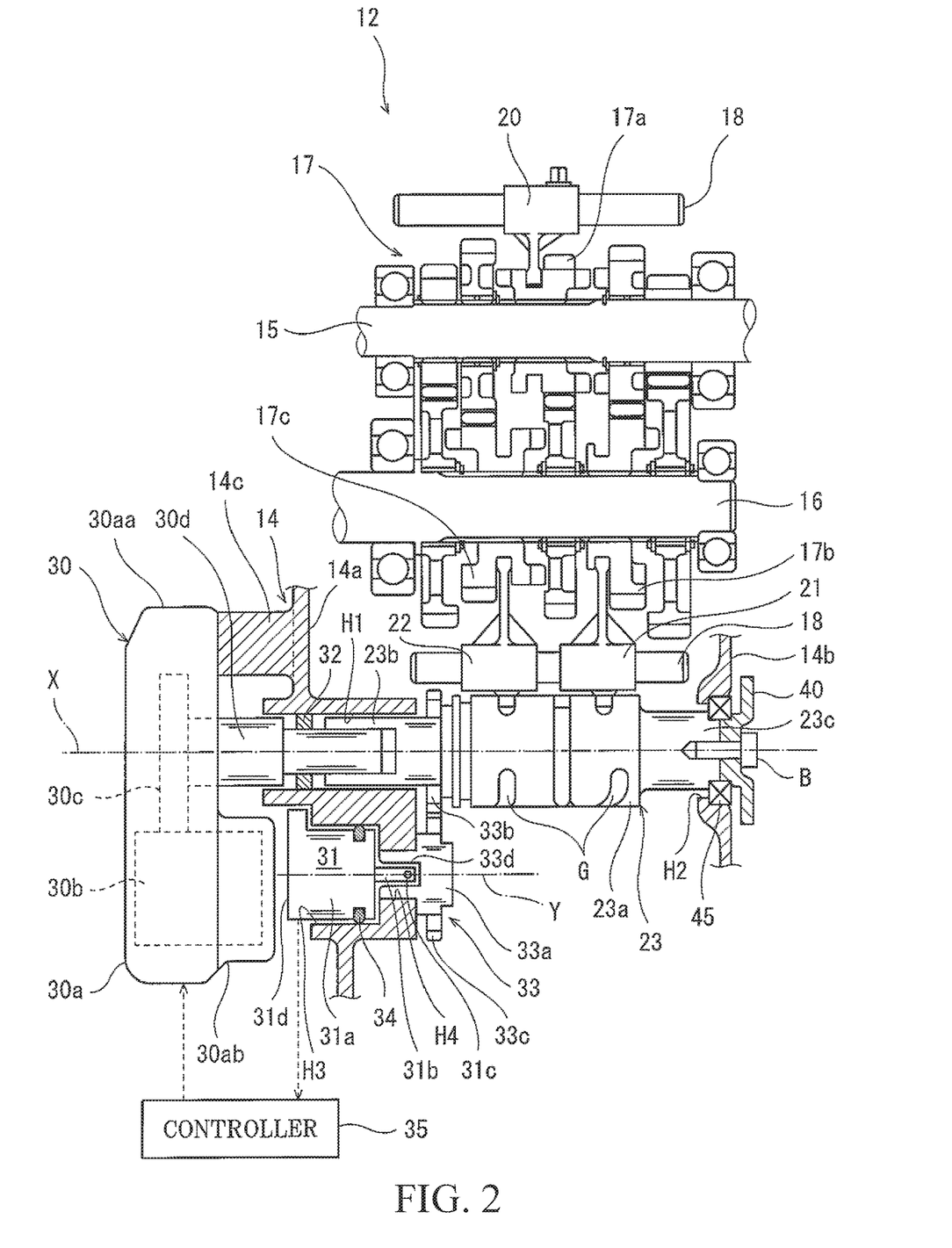
FIG. 2 is a cross-sectional view of a power unit of FIG. 1 taken along a plane passing through an input shaft, an output shaft, and a shift drum of a transmission and a detection shaft of a gear position sensor.

FIG. 2 is a cross-sectional view of the power unit PU of FIG. 1 taken along a plane passing through an input shaft 15, an output shaft 16, and a shift drum 23 of the transmission 12 and a detection shaft 31b of a gear position sensor 31. As shown in FIG. 2, the transmission 12 is a dog gear transmission configured to transmit power from the input shaft 15 to the output shaft 16 through a plurality of gear trains 17 with different reduction ratios and configured to perform speed change through a selected one of the gear trains 17. The input shaft 15 of the transmission 12 receives power transmitted from the crankshaft Ea (see FIG. 1) of the engine E. A sprocket 16a (see FIG. 3) is mounted at one end (e.g., the left end) of the output shaft 16 in the vehicle width direction, and the chain 13 (see FIG. 1) connected to the rear wheel 4 is wound around the sprocket 16a. In the case of using a belt instead of the chain 13 as the power transmission loop, it is recommended to substitute the sprocket 16a with an annular member configured to transmit power to the belt.

In the transmission 12, shift forks 20 to 22 are slidably supported on a support shaft 18 disposed parallel to the input and output shafts 15 and 16. A first end of the shift fork 20 is connected to a dog gear 17a of the input shaft 15, and first ends of the other shift forks 21 and 22 are connected to dog gears 17b and 17c of the output shaft 16, respectively. Second ends of the shift forks 20 to 22, which are opposite to the first ends, are fitted in guide grooves G of the shift drum 23. The shift drum 23 is mechanically linked to, and rotated in response to, operation of the shift lever 9 (see FIG. 1) by the rider R. Upon rotation of the shift drum 23, the shift forks 20 to 22 guided by the guide grooves G cause the dog gears 17a to 17c, respectively, to slide along the output shaft 16, bringing one of the gear trains 17 that has a reduction ratio desired by the rider R into a power transmission state. Thus, a shift change is accomplished in which a desired shift position is selected.

The crankshaft Ea, input shaft 15, output shaft 16, and shift drum 23 are enclosed in the crankcase 14 and extend in the vehicle width direction. The crankcase 14 includes a first side wall portion 14a on one side in the vehicle width direction, and the first side wall portion 14a (e.g., the left side wall portion) is provided with an insertion hole H1 and a passage hole H4. To the outer surface of the first side wall portion 14a of the crankcase 14 is secured an actuator unit 30 that outputs drive power to rotate the shift drum 23. The crankcase 14 includes a second side wall portion 14b on the other side in the vehicle width direction, and the second side wall portion 14b (e.g., the right side wall portion) is provided with an insertion hole H2 coaxial with the insertion hole H1.

The shift drum 23 includes a drum body 23a, a first end portion 23b, and a second end portion 23c. The outer circumferential surface of the drum body 23a is provided with the guide grooves G. The first end portion 23b projects from the drum body 23a to one side in the vehicle width direction (e.g., to the left) and is inserted into the insertion hole H1 of the first side wall portion 14a. The second end portion 23c projects from the drum body 23a to the other side in the vehicle width direction (e.g., to the right) and is inserted into the insertion hole H2 of the second side wall portion 14b.

The actuator unit 30 includes a housing 30a, a motor 30b, a gear train 30c, and a drive shaft 30d. The housing 30a includes a reduced-thickness portion 30aa and an increased-thickness portion 30ab projecting beyond the reduced-thickness portion 30aa toward the first side wall portion 14a. The drive shaft 30d projects from the reduced-thickness portion 30aa of the housing 30a toward the shift drum 23 and is inserted into the insertion hole H1 through a seal ring 32. The drive shaft 30d has the same rotational axis X as the shift drum 23, and is connected to the shift drum 23 on the rotational axis X. In the present embodiment, the drive shaft 30d is coupled directly to the first end portion 23b of the shift drum 23. The drive shaft 30d may be coupled to the first end portion 23b of the shift drum 23 via a coupling member which also has the rotational axis X.

Inside the increased-thickness portion 30ab of the housing 30a is enclosed the motor 30b that electrically generates drive power. Inside the reduced-thickness portion 30aa of the housing 30a is enclosed the gear train 30c that transmits the drive power generated by the motor 30b to the drive shaft 30d. The reduced-thickness portion 30aa of the actuator unit 30 is secured to a boss portion 14c projecting outwardly in the vehicle width direction from the first side wall portion 14a of the crankcase 14. The actuator unit 30 need not include the gear train 30c, and the motor 30b and drive shaft 30d may be integrally connected.

The first side wall portion 14a of the crankcase 14 is provided with a sensor mounting hole H3 adjacent to the insertion hole H1. At the bottom of the sensor mounting hole H3 is formed the passage hole H4 through which the sensor mounting hole H3 communicates with the interior of the crankcase 14. The gear position sensor 31 is mounted into the sensor mounting hole H3 from outside the crankcase 14. The gear position sensor 31 is a sensor that detects the rotation angle of the shift drum 23 to determine which angular position the shift drum 23 is in and thus determine the currently used shift position of the transmission 12.

The gear position sensor 31 includes a sensor body 31a, the detection shaft 31b, an engaging pin 31c, and a stationary portion 31d. To the sensor body 31a is connected a signal cable (not illustrated). The sensor body 31a has a circular cylindrical outer surface. The sensor body 31a is mounted in the sensor mounting hole H3, and a seal ring 34 is fitted around the sensor body 31a. The detection shaft 31b projects from the inner end face of the sensor body 31a into the passage hole H4 and has a detection axis Y. The engaging pin 31c projects from the detection shaft 31b in a direction perpendicular to the detection axis Y. The stationary portion 31d projects in a direction perpendicular to the detection axis Y from that portion of the sensor body 31a which is opposite from the detection shaft 31b. The stationary portion 31d is secured to the outer surface of the first side wall portion 14a.

The gear position sensor 31 is disposed in such a manner that the detection axis Y of the detection shaft 31b is parallel to the rotational axis X of the shift drum 23. Between the shift drum 23 and the gear position sensor 31 is disposed a power transmission mechanism 33. The gear position sensor 31 is disposed outside the crankcase 14, while the power transmission mechanism 33 is disposed inside the crankcase 14.

The power transmission mechanism 33 includes a rotary member 33a, a first gear 33b, and a second gear 33c. The rotary member 33a is rotatably inserted into the passage hole H4 of the first side wall portion 14a. An end face of the rotary member 33a is provided with an insertion hole 33d into which the detection shaft 31b of the gear position sensor 31 is inserted. The engaging pin 31c of the gear position sensor 31 engages with an engagement portion (not illustrated) formed in the inner circumferential surface of the insertion hole 33d and is thus positioned relative to the rotary member 33a in the circumferential direction around the detection axis Y. Thus, the engaging pin 31c enables the detection shaft 31b of the gear position sensor 31 to rotate together with the rotary member 33a.

The first gear 33b is fitted around the shift drum 23 to rotate together with the shift drum 23. The second gear 33c is fitted around the rotary member 33a to rotate together with the rotary member 33a. The second gear 33c is in mesh with the first gear 33b. The first and second gears 33b and 33c have the same number of teeth and transmit power without change in rotational speed. A power transmission route including the power transmission mechanism 33 and the detection shaft 31b passes through the passage hole H4 of the first side wall portion 14a. In the present example, the rotary member 33a and the detection shaft 31b pass through the passage hole H4. The rotational power of the shift drum 23 is transmitted to the detection shaft 31b through the first gear 33b, second gear 33c, and rotary member 33a without change in rotational speed. Thus, the rotational speed of the rotary member 33a is equal to the rotational speed of the shift drum 23.

The gear position sensor 31 (in particular its sensor body 31a) is electrically connected to a controller 35 that controls the engine E. The controller 35 is electrically connected to the motor 30b of the actuator unit 30 to control the operation of the actuator unit 30.

The second end portion 23c of the shift drum 23 is inserted into the insertion hole H2 of the second side wall portion 14b and supported by the second side wall portion 14b via a bearing 45. A cam member 40, which will be described in detail later, is secured to the end face of the second end portion 23c of the shift drum 23 by a fastening element B. The cam member 40 is disposed outwardly of the second side wall portion 14b in the vehicle width direction. Specifically, the cam member 40 is disposed in a clutch chamber C (see FIG. 4) of the crankcase 14.

Figure 3:
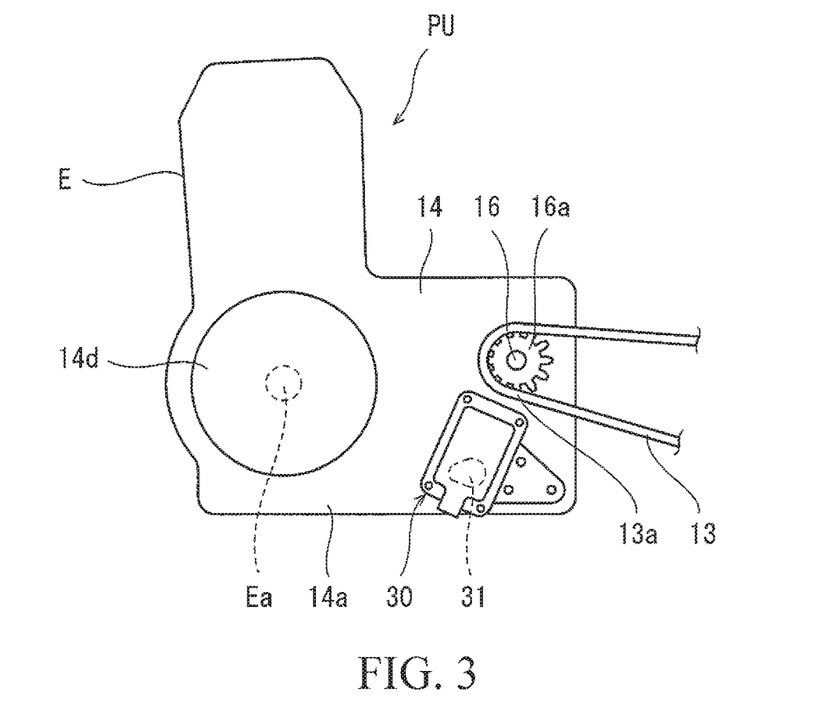
FIG. 3 is a schematic view of the power unit of FIG. 2 as seen from the left side.

FIG. 3 is a schematic view of the power unit PU of FIG. 2 as seen from the left side. As shown in FIG. 3, an electricity generator cover 14d is mounted on the first side wall portion 14a of the crankcase 14 to cover an electricity generator (not illustrated) connected to one end of the crankshaft Ea. The actuator unit 30 is located rearwardly of the electricity generator cover 14d and beneath the sprocket 16a of the output shaft 16. The location of a part of the actuator unit 30 in the front-rear direction is the same as the location of a part of the sprocket 16a in the front-rear direction. Thus, the sprocket 16a and the actuator unit 30, as viewed in the vertical direction, overlap each other.

Since the actuator unit 30 is secured to the boss portion 14c (see FIG. 2) of the first side wall portion 14a of the crankcase 14, the actuator unit 30 as viewed from the gear position sensor 31 is located outwardly in the vehicle width direction. The actuator unit 30 as viewed from the outside in the vehicle width direction (from the left side in FIG. 3) overlaps the gear position sensor 31. Thus, the gear position sensor 31 as viewed from the outside in the vehicle width direction is hidden by the actuator unit 30.

The actuator unit 30 is inclined to extend downwardly and forwardly. Specifically, the housing 30a of the actuator unit 30 is disposed in such a manner that the housing 30a as viewed in the vehicle width direction has a vertically long shape and has a longitudinal axis extending upwardly and rearwardly (or downwardly and forwardly). The chain 13 engaged with the sprocket 16a includes a portion 13a facing the upper side of the actuator unit 30, and the portion 13a extends obliquely downward toward the rear of the vehicle. Thus, the actuator unit 30 is disposed in such a manner that its upper end face extends along the portion 13a of the chain 13.

Figure 4:
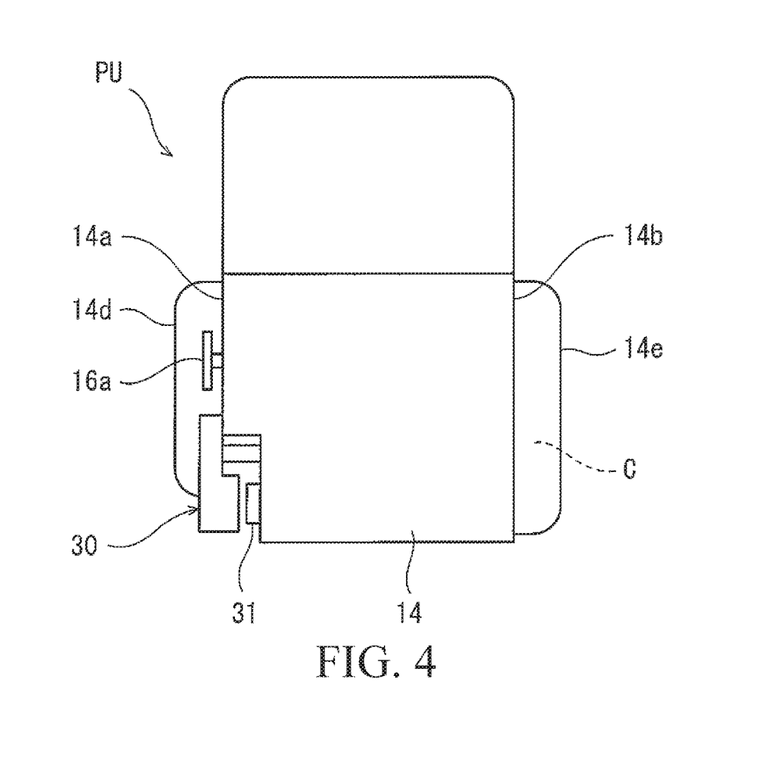
FIG. 4 is a schematic view of the power unit of FIG. 3 as seen from the rear.

FIG. 4 is a schematic view of the power unit PU of FIG. 3 as seen from the rear. As shown in FIG. 4, the electricity generator cover 14d is mounted on the first side wall portion 14a of the crankcase 14, and a clutch cover 14e is mounted on the second side wall portion 14b of the crankcase 14. Between the clutch cover 14e and the second side wall portion 14b is formed the clutch chamber C (see FIG. 4). A main clutch (not shown) is enclosed in the clutch chamber C which is a space surrounded by the clutch cover 14e. The main clutch functions to disable and enable power transmission from the crankshaft Ea to the input shaft 15. The electricity generator cover 14d projects outwardly of the first side wall portion 14a in the vehicle width direction. The actuator unit 30 is disposed inwardly of the outer end of the crankcase 14 (the outer end of the electricity generator cover 14d) in the vehicle width direction. The gear position sensor 31 is disposed inwardly of the outer end of the first side wall portion 14a of the crankcase 14 in the vehicle width direction.

Figure 5:
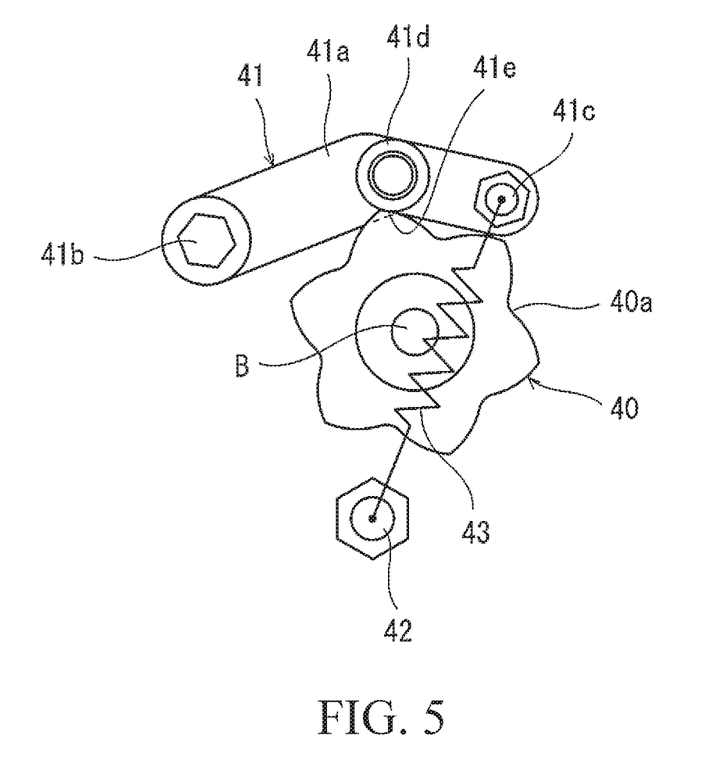
FIG. 5 is a schematic view of a cam member and other members of the power unit of FIG. 2 as seen from the right side.

FIG. 5 is a schematic view of the cam member and other members of the power unit of FIG. 2 as seen from the right side. As shown in FIG. 5, the cam member 40, a swinging member 41, a stationary member 42, and a spring member 43 are disposed on the side of the outer surface of the second side wall portion 14b of the crankcase 14 (see FIG. 2); that is, these members are opposed to the actuator unit 30 across the crankcase 14 in the direction of the rotational axis X. The cam member 40 is secured to an end face of the shift drum 23 by the fastening element B and rotates together with the shift drum. The cam member 40 has an outer circumferential surface provided with a plurality of recesses 40a arranged circumferentially at intervals. The recesses 40a are in one-to-one correspondence with a plurality of shift positions of the transmission 12.

The swinging member 41 includes a projection 41e contacting the outer circumferential surface of the cam member 40 and fittable into the recesses 40a. Specifically, the swinging member 41 includes a swinging arm 41a, a pivot member 41b secured to the second side wall portion 14b and connected to the proximal end of the swinging arm 41a, a point-of-effort member 41c connected to the distal end of the swinging arm 41a, and a roller 41d disposed between the pivot member 41b and the point-of-effort member 41c and rotatably supported by the swinging arm 41a. The roller 41d projects toward the outer circumferential surface of the cam member 40 and rolls on the outer circumferential surface of the cam member 40. That is, the portion of the roller 41d that contacts the outer circumferential surface of the cam member 40 serves as the projection 41e of the swinging member 41.

The stationary member 42 is secured to the second side wall portion 14b at a location such that the stationary member 42 is opposed to (situated below) the swinging member 41 across the cam member 40. The spring member 43 is tensioned between the stationary member 42 and the point-of-effort member 41c. The point-of-effort member 41c of the swinging member 41 is biased by the spring member 43 toward the cam member 40, and thus the roller 41d (i.e., the projection 41e) is pressed against the outer circumferential surface of the cam member 40. When the shift drum 23 rotates to make a shift change from one shift position to the next shift position, the roller 41d moves from one recess 40a of the cam member 40 to the next recess 40a. That is, the roller 41d (projection 41e) is positioned in one of the recesses 40a of the outer circumferential surface of the cam member 40, and thus the shift drum 23 is prevented from stopping at an intermediate rotation angle between the adjacent shift positions. The biasing force of the spring member 43 is grater than the rotational resistance force of the actuator unit 30 in a power-off state and smaller than the drive power of the actuator unit 30.

In the configuration described above, the drive shaft 30d of the actuator unit 30 has the same rotational axis X as the shift drum 23 and is connected to the shift drum 23 on the rotational axis X, and thus the rotational drive power of the drive shaft 30d is transmitted to the shift drum 23 on the rotational axis X of the shift drum 23. That is, the power transmission route from the drive shaft 30d to the shift drum 23 is straight. Hence, the linkage mechanism between the drive shaft 30d and the shift drum 23 can be simplified. Further, no reinforcement is needed for power transmission, and a weight increase can be prevented.

Additionally, since the gear position sensor 31 is disposed in such a manner that the detection axis Y of the detection shaft 31b is parallel to the rotational axis X of the shift drum 23, there is no need to dispose the gear position sensor 31 on the rotational axis X of the shift drum 23. Thus, the flexibility in disposing the gear position sensor 31 can be increased.

Additionally, since the gear position sensor 31 is disposed outside the crankcase 14 and the power transmission mechanism 33 is disposed inside the crankcase 14, the power transmission mechanism 33 can be lubricated with an oil present in the crankcase 14 while the gear position sensor 31 is disposed outside the crankcase 14.

Additionally, since the actuator unit 30 is disposed beneath the sprocket 16a and inclined to extend downwardly and forwardly, the actuator unit 30 can be prevented from interfering with the chain 13 and, at the same time, the vertical dimension of the space occupied by the actuator unit 30 can be reduced.

Additionally, since the actuator unit 30 as viewed from the outside in the vehicle width direction overlaps the gear position sensor 31, the gear position sensor 31 can be protected by the actuator unit 30. Further, since the actuator unit 30 is disposed inwardly of the outer end of the crankcase 14 in the vehicle width direction, external damage to the actuator unit 30 can be reduced.

Additionally, since the biasing force of the spring member 43 biasing the swinging member 41 toward the cam member 40 is smaller than the drive power of the actuator unit 30, the drive power of the actuator unit 30 overcomes the biasing force of the spring member 43 to allow the projection 41e of the swinging member 41 to move out of the recess 40a of the cam member 40, thereby accomplishing a shift change. Further, since the biasing force of the spring member 43 is greater than the rotational resistance force of the actuator unit 30 in a power-off state, the biasing force of the spring member 43 allows the projection 41e of the swinging member 41, when any shift change is not made, to remain fitted in the recess 40a of the cam member 40. Thus, erroneous detection by the gear position sensor 31 can be prevented. Additionally, since the cam member 40, the swinging member 41, and the spring member 43 are opposed to the actuator unit 30 across the crankcase 14 in the direction of the rotational axis X, the power unit PU can be made compact.

The present invention is not limited to the embodiment described above, and modifications, additions, or omissions can be made to the configuration of the above embodiment. For example, while in the above embodiment a motorcycle is presented as an example of the straddle vehicle of the present invention, the straddle vehicle may be another type of vehicle (such as an automotive three-wheeled vehicle or an all terrain vehicle). While in the above embodiment an engine (internal combustion engine) is presented as an example of the drive source for travel which constitutes a part of the power unit PU, the drive source for travel may be an electric motor or may include both an electric motor and an engine. When the straddle vehicle is an electric vehicle including only an electric motor as a drive source for travel, a case enclosing a transmission that receives drive power transmitted from the electric motor is used instead of the crankcase.

The power transmission mechanism 33 need not necessarily be configured to transmit the rotation of the shift drum 23 to the detection shaft 31b without changing the speed of rotation. When the power transmission mechanism 33 is configured to change the speed of rotation transmitted from the shift drum 23 to the detection shaft 31b, the rotational speed detected by the detection shaft 31b may be multiplied by an inverse of the gear ratio of the power transmission mechanism 33 to calculate the rotational speed of the shift drum 23. The gear position sensor 31 may be a proximity sensor disposed away from the rotational axis X of the shift drum 23 and configured to detect the rotational speed of the shift drum 23 in a non-contact manner (e.g., magnetically).

What is claimed is:

1. A straddle vehicle comprising:
    a shift drum that makes a shift change of a transmission including a plurality of gear trains;
    a transmission case enclosing the shift drum, the transmission case comprising a side wall portion provided with an insertion hole into which an end portion of the shift drum is inserted;
    an actuator unit secured to an outer surface of the side wall portion, the actuator unit comprising a drive shaft that outputs drive power to rotate the shift drum, the drive shaft having the same rotational axis as the shift drum and being connected to the shift drum on the rotational axis; and
    a gear position sensor that detects a rotational angle of the shift drum, wherein
    the gear position sensor is provided at the outer surface of the side wall portion of the transmission case in a vehicle width direction, and
    the actuator unit overlaps the gear position sensor such that the gear position sensor is hidden by the actuator unit as viewed from outside in the vehicle width direction.

2. The straddle vehicle according to claim 1, wherein the gear position sensor is disposed away from the rotational axis of the shift drum.

3. The straddle vehicle according to claim 2, further comprising a power transmission mechanism linked to the shift drum, wherein
    the gear position sensor comprises a detection shaft to which the rotation of the shift drum is transmitted through the power transmission mechanism, and
    the gear position sensor is disposed in such a manner that a detection axis of the detection shaft is parallel to the rotational axis of the shift drum.

4. The straddle vehicle according to claim 3, wherein
    the side wall portion is provided with a passage hole through which passes a power transmission route including the power transmission mechanism and the detection shaft,
    the gear position sensor is disposed outside the transmission case, and
    the power transmission mechanism is disposed inside the transmission case.

5. The straddle vehicle according to claim 1, further comprising:
    a power transmission loop that transmits rotational power from an output shaft of the transmission to a rear wheel of the straddle vehicle; and an annular member that is disposed at an end of the output shaft and around which the power transmission loop is wound, wherein the actuator unit is disposed beneath the annular member, and the actuator unit is inclined to extend downwardly and forwardly.

6. The straddle vehicle according to claim 1, wherein the actuator unit is disposed further inward than an outer end of the transmission case in the vehicle width direction.

7. The straddle vehicle according to claim 1, further comprising:

a cam member rotatable together with the shift drum, the cam member having an outer circumferential surface provided with a plurality of recesses arranged circumferentially at intervals, the plurality of recesses being in one-to-one correspondence with a plurality of shift positions of the transmission;

a swinging member comprising a projection contacting the outer circumferential surface of the cam member, the projection being fittable into the recesses;

a spring member biasing the projection of the swinging member toward the outer circumferential surface of the cam member, wherein a biasing force of the spring member is greater than a rotational resistance force of the actuator unit in a power-off state and smaller than the drive power of the actuator unit.

8. The straddle vehicle according to claim 7, wherein the cam member, the swinging member, and the spring member are opposed to the actuator unit across the transmission case in a direction of the rotational axis.

9. The straddle vehicle according to claim 1, wherein the gear position sensor is disposed further inward than an electricity generator cover of the transmission case in the vehicle width direction.

\* \* \* \* \*

UNITED STATES PATENT AND TRADEMARK OFFICE
CERTIFICATE OF CORRECTION

PATENT NO. : 11,415,219 B2
APPLICATION NO. : 16/895128
DATED : August 16, 2022
INVENTOR(S) : Katsuya Sano et al.

It is certified that error appears in the above-identified patent and that said Letters Patent is hereby corrected as shown below:

On the Title Page

Item (71), delete "Hyogo (JP)" and insert --Akashi-shi (JP)--,

Item (73), delete "Kobe (JP)" and insert --Akashi-shi (JP)--.

Signed and Sealed this
Fifteenth Day of November, 2022

Katherine Kelly Vidal
*Director of the United States Patent and Trademark Office*